United States Patent
Soininen et al.

(10) Patent No.: US 10,863,566 B2
(45) Date of Patent: Dec. 8, 2020

(54) METHOD FOR ESTABLISHING A CONNECTION BETWEEN A TERMINAL OF A FIRST TYPE AND A CORE NETWORK OF A SECOND TYPE IN A TELECOMMUNICATIONS NETWORK

(71) Applicant: Nokia Technologies Oy, Espoo (FI)

(72) Inventors: Jonne Soininen, Mountain View, CA (US); Sami Uskela, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 15/464,542

(22) Filed: Mar. 21, 2017

(65) Prior Publication Data

US 2017/0196041 A1    Jul. 6, 2017

Related U.S. Application Data

(60) Division of application No. 10/330,240, filed on Dec. 30, 2002, now Pat. No. 9,642,177, which is a
(Continued)

(30) Foreign Application Priority Data

Jun. 29, 2000 (FI) .................................... 20001544

(51) Int. Cl.
*H04W 76/16* (2018.01)
*H04W 76/12* (2018.01)
(Continued)

(52) U.S. Cl.
CPC ............ *H04W 76/16* (2018.02); *H04W 8/22* (2013.01); *H04W 36/0033* (2013.01); *H04W 76/12* (2018.02); *H04L 12/64* (2013.01)

(58) Field of Classification Search
None
See application file for complete search history.

(56) References Cited

U.S. PATENT DOCUMENTS 5,528,664 A    6/1996 Slekys et al.
5,729,534 A    3/1998 Jokinen et al.
(Continued)

FOREIGN PATENT DOCUMENTS

EP    0 883 324 A2    12/1998
WO    WO 00/01186 A1    1/2000
(Continued)

OTHER PUBLICATIONS

Examination Report from corresponding European Patent Appl. No. 01951748.1, dated Jul. 2, 2010.
(Continued)

Primary Examiner — Mohammad S Adhami
(74) Attorney, Agent, or Firm — Alston & Bird LLP

(57) ABSTRACT

A method for establishing a connection between a circuit-switched mobile station (MS) and a packet-switched switching element (MSC). A radio network controller (RNC) receives a first initiation signal (an attach request) from the mobile station (MS) via a circuit-switched connection. The RNC opens a signaling connection for the mobile station. While the signaling connection is active, the RNC receives a second initiation signal (call setup) and opens a real-time connection for the mobile station. Thus the packet-switched switching element (MSC) is able to switch a real-time connection to/from the circuit-switched mobile station (MS).

16 Claims, 3 Drawing Sheets

Related U.S. Application Data continuation of application No. PCT/FI01/00620, filed on Jun. 28, 2001.

(51) Int. Cl.
*H04W 8/22* (2009.01)
*H04W 36/00* (2009.01)
*H04L 12/64* (2006.01)

(56) References Cited

U.S. PATENT DOCUMENTS

| | | | |
|---|---|---|---|
| 6,219,346 B1 | 4/2001 | Maxemchuk | |
| 6,363,253 B1* | 3/2002 | Valentine | H04W 76/10 455/445 |
| 6,374,112 B1 | 4/2002 | Widegren et al. | |
| 6,463,055 B1 | 10/2002 | Lupien et al. | |
| 6,490,451 B1* | 12/2002 | Denman | H04W 88/16 455/436 |
| 6,496,690 B1 | 12/2002 | Cobo et al. | |
| 6,608,832 B2 | 8/2003 | Forslow | |
| 6,654,610 B1 | 11/2003 | Chen et al. | |
| 6,678,526 B1 | 1/2004 | Sugirtharaj | |
| 6,683,853 B1 | 1/2004 | Kannas et al. | |
| 6,724,748 B1 | 4/2004 | Stille et al. | |
| 6,839,339 B1 | 1/2005 | Chuah | |
| 6,937,566 B1* | 8/2005 | Forslow | H04L 1/0017 370/231 |
| 6,985,446 B1 | 1/2006 | Hurtta et al. | |
| 7,116,646 B1 | 10/2006 | Gustafson et al. | |
| 7,336,649 B1 | 2/2008 | Huang | |
| 9,642,177 B2* | 5/2017 | Soininen | H04W 8/22 |
| 2001/0031635 A1* | 10/2001 | Bharatia | H04W 12/08 455/432.1 |
| 2002/0111173 A1 | 8/2002 | Hendrey et al. | |
| 2002/0160775 A1 | 10/2002 | Pecen et al. | |
| 2003/0039237 A1 | 2/2003 | Forslow | |
| 2004/0058688 A1 | 3/2004 | Silver et al. | |
| 2004/0131053 A1 | 7/2004 | Sjolund et al. | |

FOREIGN PATENT DOCUMENTS

| | | | |
|---|---|---|---|
| WO | WO 00/16576 A1 | | 3/2000 |
| WO | WO20000018155 | * | 3/2000 |
| WO | WO 00/21254 A2 | | 4/2000 |
| WO | WO 00/21310 A1 | | 4/2000 |
| WO | WO 00/41425 A1 | | 7/2000 |
| WO | WO 00/56088 A1 | | 9/2000 |
| WO | WO 00/64203 A1 | | 10/2000 |
| WO | WO 00/64211 A1 | | 10/2000 |
| WO | WO 01/01718 A1 | | 1/2001 |

OTHER PUBLICATIONS

Office Action for corresponding European Patent Application No. 01951748.1 dated Jan. 30, 2017.
Office Action for U.S. Appl. No. 10/330,240 dated Nov. 19, 2015.
Office Action for U.S. Appl. No. 10/330,240 dated Apr. 24, 2014.
Office Action for U.S. Appl. No. 10/330,240 dated Oct. 2, 2013.
Office Action for U.S. Appl. No. 10/330,240 dated Jul. 11, 2012.
Office Action for U.S. Appl. No. 10/330,240 dated Jan. 21, 2011.
Office Action for U.S. Appl. No. 10/330,240 dated Feb. 1, 2010.
Office Action for U.S. Appl. No. 10/330,240 dated Aug. 3, 2009.
Office Action for U.S. Appl. No. 10/330,240 dated Mar. 28, 2008.
Office Action for U.S. Appl. No. 10/330,240 dated Jan. 10, 2017.
Office Action for U.S. Appl. No. 10/330,240 dated Jul. 7, 2016.
Office Action for U.S. Appl. No. 10/330,240 dated Jan. 15, 2015.
Office Action for U.S. Appl. No. 10/330,240 dated Feb. 11, 2013.
Office Action for U.S. Appl. No. 10/330,240 dated Sep. 13, 2011.
Office Action for U.S. Appl. No. 10/330,240 dated Jul. 20, 2010.
Office Action for U.S. Appl. No. 10/330,240 dated Mar. 4, 2009.
Office Action for U.S. Appl. No. 10/330,240 dated Oct. 5, 2017.
Advisory Action for U.S. Appl. No. 10/330,240 dated Jul. 9, 2015.
Advisory Action for U.S. Appl. No. 10/330,240 dated Jun. 20, 2013.
Advisory Action for U.S. Appl. No. 10/330,240 dated May 11, 2009.
Notice of Allowance for U.S. Appl. No. 10/330,240 dated Dec. 19, 2016.
Notice of Allowance for U.S. Appl. No. 10/330,240 dated Mar. 9, 2017.
International Search Report for Application No. PC/FI2001/00620 dated Oct. 9, 2001.

* cited by examiner

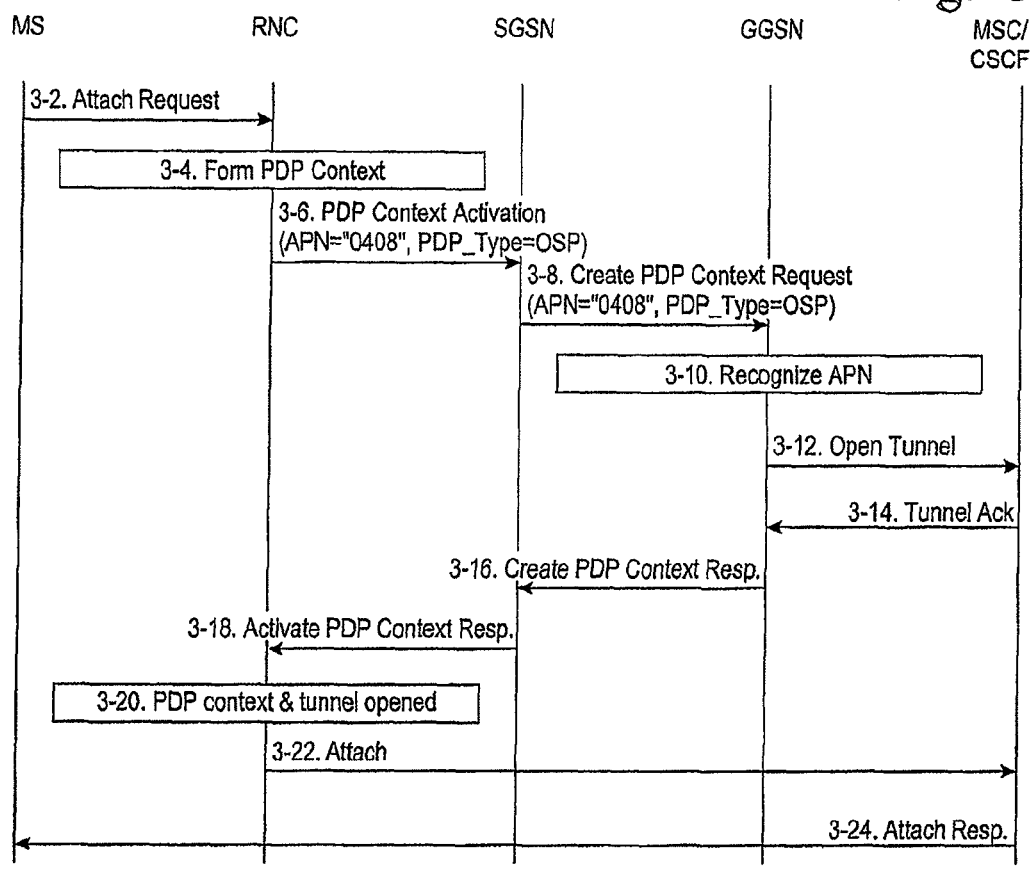

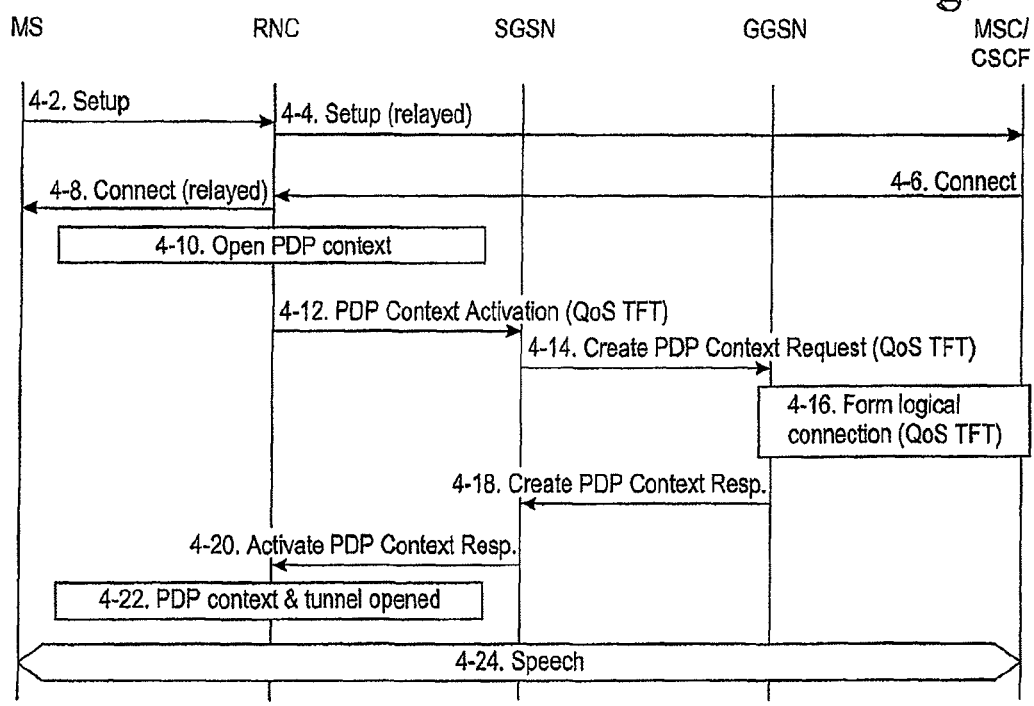
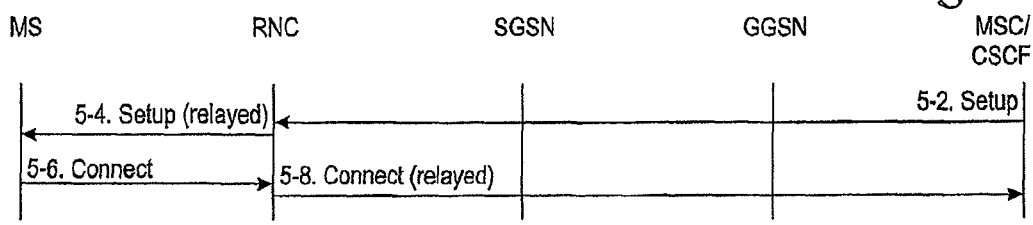
Continue at step 4-10 in Figure 4

METHOD FOR ESTABLISHING A CONNECTION BETWEEN A TERMINAL OF A FIRST TYPE AND A CORE NETWORK OF A SECOND TYPE IN A TELECOMMUNICATIONS NETWORK

CROSS-REFERENCE TO RELATED APPLICATIONS

This application is a divisional of U.S. application Ser. No. 10/330,240, filed on Dec. 30, 2002, which is a Continuation of International Application PCT/FI01/00620 filed on Jun. 28, 2001, which claims the benefit of Finnish Application No. 20001544, filed on Jun. 29, 2000, the entire contents of which are incorporated herein by reference.

BACKGROUND OF THE INVENTION

Field of the Invention

The invention relates to methods and equipment for supporting a dissimilar terminal in a network, such as a circuit-switched terminal in a packet network or vice versa.

FIG. 1 is a block diagram of a telecommunications system showing the components which are essential for understanding the invention. A UMTS Mobile Station MS consists of Mobile Equipment ME and a USIM card (User and Services and Identity Module). There is a radio interface Uu between the MS and a Radio Access Network RAN which comprises Base Stations BS under control of Radio Network Controllers RNC. For circuit-switched services, the RNCs are connected to Mobile services Switching Centers MSC, and for packet-switched services, there is a connection to Serving GPRS Support Nodes SGSN (GPRS=General Packet Radio Service). The MSC and SGSN elements may include separate UMTS addition sections. Subscriber data related to the MS is stored permanently in a Home Location Register HLR and for circuit-switched operation, the data is transferred to the Visitor Location Register VLR of the MSC which currently serves the MS. For storing equipment-related data, the network comprises an Equipment Identity Register EIR. For entering and updating subscriber-specific data, there is an Operation and Maintenance O&M section having a Man-Machine Interface MMI. For creating and managing supplementary services, there is typically a dedicated Service Control Node SCN which can be seen as an evolved version of a Service Control Point (SCP) of Intelligent Networks.

Only the packet-switched section will be described in more detail, and it is assumed that this section will resemble a GPRS system. The GPRS infrastructure comprises support nodes such as a GPRS gateway support node (GGSN) and a GPRS serving support node (SGSN). The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS mobile station, and keep a record of the location of the mobile stations inside its service area. The subscription information is stored in a GPRS register (HLR) where the mapping between a mobile's identity (such as MS-ISDN or IMSI) and the PSPDN address is stored. The GPRS register acts as a data-base from which the SGSNs can ask whether a new MS in its area is allowed to join the GPRS network.

The GPRS gateway support nodes GGSN connect an operator's GPRS network to external systems, such as other operators' GPRS systems, data networks 11, such as an IP (Internet protocol) network (such as the Internet) or an X.25 network, and service centers. Fixed hosts 14 can be connected to a data network 11, e.g., by means of a local area network LAN and a router 15. A border gateway BG provides access to an inter-operator GPRS backbone network 12. The GGSN may also be connected directly to a private corporate network or a host. The GGSN includes GPRS subscribers' PDP (Packet Data Protocol) addresses and routing information, i.e., SGSN addresses. Routing information is used for tunneling protocol data units PDU from the data network 11 to the current switching point of the MS, i.e., to the serving SGSN. The functionalities of the SGSN and GGSN can be connected to the same physical node.

The home location register HLR of the GSM network contains GPRS subscriber data and routing information and it maps the subscriber's IMSI into an SGSN address and one or more pairs of the PDP type and PDP address. The HLR also maps each PDP type and PDP address pair into a GGSN node. The SGSN has a Gr interface to the HLR (a direct signaling connection or via an internal backbone network 13). The HLR of a roaming MS and its serving SGSN may be located in different mobile communication networks.

The intra-operator backbone network 13, which interconnects an operator's SGSN and GGSN equipment can be implemented, for example, by means of a local network, such as an IP network. An operator's GPRS network can also be implemented without the intra-operator backbone network, for example by providing all features in one computer.

A problem with the network architecture as shown in FIG. 1 is that a subscriber must have a UMTS handset in order to access UMTS services. A subscriber with a handset capable of only circuit-switched operation cannot use the services provided by a UMTS network. As a result, the RNC-to-MSC interface(s) must support both circuit-switched and packet-switched operation.

SUMMARY OF THE INVENTION

An object of the invention is to provide a mechanism for solving the problems mentioned above. This object is achieved with a method and equipment which are characterized by what is disclosed in the attached independent claims. Preferred embodiments of the invention are disclosed in the attached dependent claims.

The invention is based on the idea that a radio network controller (RNC) operates towards a mobile station as a circuit-switched RNC does. In other words, the RNC (or another radio network node, such as a base station) emulates a packet-switched mobile station to the uplink network, and it emulates a circuit-switched network/telephone exchange to the mobile station.

The emulator function can be implemented by means of the following steps:

1. The radio network controller (RNC) receives a first initiation signal from the mobile station via a circuit-switched connection. In response to the first initiation signal, the RNC opens a first PDP context (such as a signaling PDP context) for the mobile station.

2. The RNC receives a second initiation signal and uses the first PDP context to open a second PDP context (such as a real-time PDP context).

As a result, the packet-switched switching element, such as an MSC, is able to support real-time connections to/from the circuit-switched mobile station. As used here, a 'circuit-switched mobile station' means a mobile station that uses only circuit-switched protocols. Similarly, a 'packet-switched switching element' means a switching element (such as an MSC or MSC server) that uses packet-switched protocols.

In response to the first initiation signal, the RNC requests the GGSN to open a first PDP context for the mobile station. The first initiation signal is preferably an attach request from the mobile station, and the first PDP context for the mobile station is preferably a signaling PDP context. This means that the signaling PDP context is maintained as long as the mobile station is attached to the network. A signaling PDP context is a context which is used to carry application signaling between the mobile station and network elements outside the packet-switched network, i.e., beyond the Gi interface, transparently to the network.

The second initiation signal is preferably a request to establish a call (a voice, data, fax or video call) to/from the mobile station, and the second PDP context is a real-time context. A real-time context is a context which is used to carry real-time data, such as calls. This means that the real-time context is maintained only for the duration of an active call.

As an alternative, the first and the second initiation signals can be the same, i.e., the request for call setup. In other words, both PDP contexts are created only for the duration of an active call. Because the GGSN only has to maintain a context for mobile stations having an active call, this embodiment saves some memory in the GGSN. Call establishment is slower, however, because two contexts have to be created.

Thus, as soon as the RNC receives a call request, it automatically opens a real-time PDP context for the mobile station. The PDP context is opened to a GGSN node with a connection to a Call State Control Function (CSCF) or an MSC server. An MSC server is an MSC acting on top of an IP protocol stack (an MSC plus an interworking function, IWF), or in other words, an MSC which understands the IP protocol. Then a tunnel is established between the mobile station and the CSCF or the MSC server, based on an OSP PDP context or a special PDP context. The OSP (Octet Stream Protocol) PDP context is based on ETSI recommendations. The term "special PDP context", as used here, refers to a PDP context which is specially optimized for circuit-switched services). The circuit-switched data to/from the mobile station is carried via this tunnel. The special PDP context is used to carry GSM 04.08 or UMTS 24.008 mobile radio interface layer 3 signaling (call control and mobility management) from the RNC to the GGSN which forms an access point. The access point is such that from it a tunnel can be opened towards the IWF associated with the MSC. The mobile radio interface layer 3 signaling comprises, for example, call-related signaling (such as call setup, control and release) and mobility management-related signaling (such as location updating, attach and detach operations). The signaling messages are encapsulated into data packets.

After the signaling PDP context has been established and the call setup signaling has been carried to the IWF and MSC, a user data bearer can be allocated between the RNC and the MSC/IWF.

The signaling PDP context and the tunnel can be created in response to an MS-initiated attach procedure or a call setup from the mobile station. Establishing the tunnel in connection with an attach procedure is the preferred course of action because the tunnel can be used for mobile-terminated calls as well. Call establishment is faster and easier if the signaling PDP context has been opened beforehand. Some memory is wasted by maintaining the PDP context continuously (versus maintaining the PDP context only during a call) but the memory waste can be kept to a minimum by making use of the PDP context which is specially optimized for circuit-switched services, as stated above.

The invention can also be used in the reverse direction, that is, for establishing a connection between a packet-switched mobile station (or other terminal) and a circuit-switched exchange (or other switching element).

BRIEF DESCRIPTION OF THE DRAWINGS

The invention will be described in more detail by means of preferred embodiments with reference to the appended drawing wherein:

FIG. 3 is a signaling diagram illustrating a procedure for opening a signaling PDP context in response to a mobile station's attach procedure;

FIG. 4 is a signaling diagram illustrating a procedure for opening a real-time PDP context in response to a mobile-originated call request; and FIG. 5 is a signaling diagram illustrating a procedure for opening a real-time PDP context in response to a mobile-terminated call request.

DETAILED DESCRIPTION OF THE PREFERRED EMBODIMENT(S)

Figure 1:
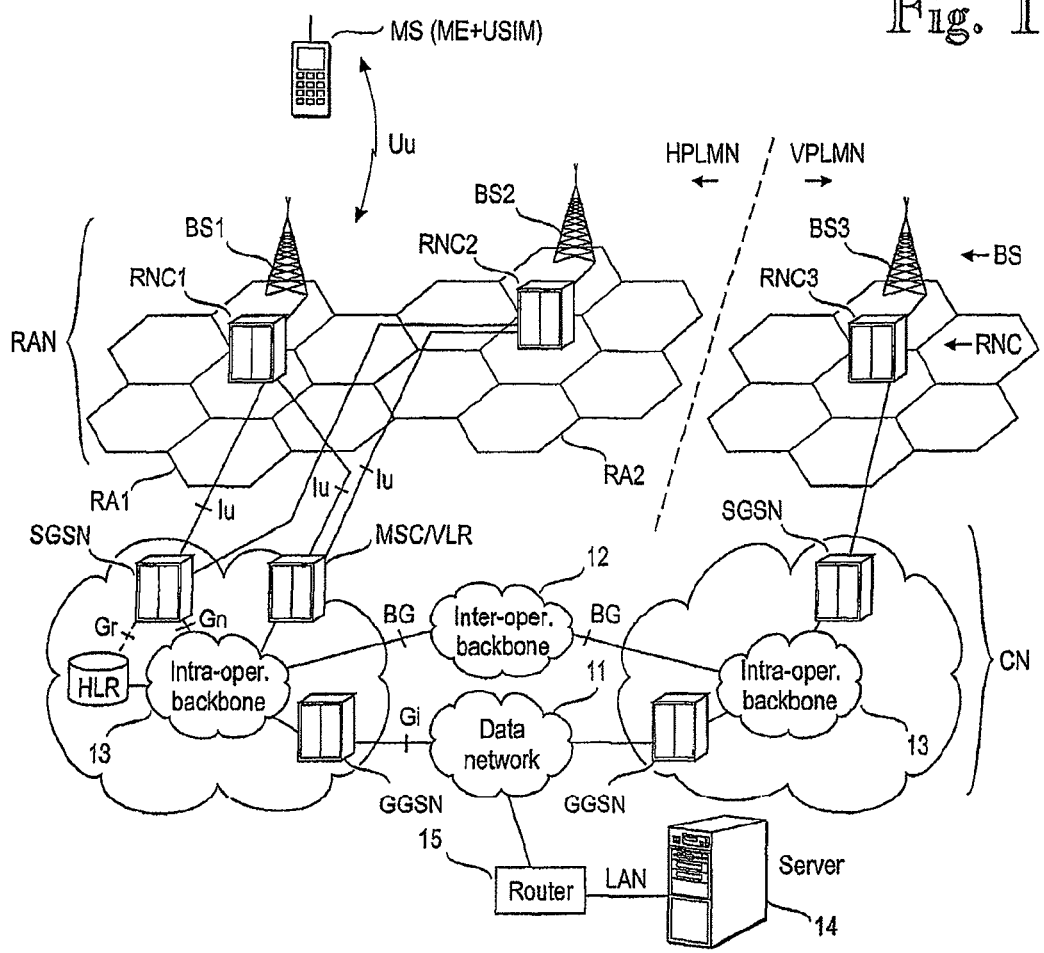
FIG. 1 is a block diagram illustrating one embodiment of the invention.
Figure 2:
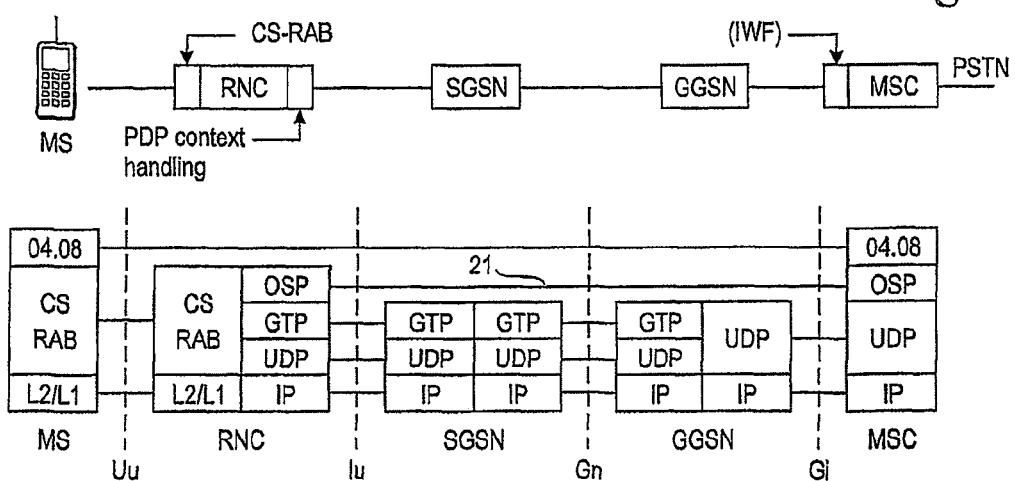
FIG. 2 illustrates tunneling and protocol stacks according to a preferred embodiment of the invention.

FIG. 2 illustrates tunneling and protocol stacks according to a preferred embodiment of the invention. The top half of FIG. 2 shows some of the elements of the telecommunication system shown in FIG. 1, and the bottom half shows the protocol stacks used in the corresponding elements in the top half of the Figure. The embodiment of the invention shown in FIG. 2 makes use of a tunnel 21 between the RNC and the MSC (or any other element which routes circuit-switched connections in the network). The tunnel 21 is built using GTP (GPRS Tunneling Protocol) between the RNC and the GGSN and UDP (User Datagram Protocol) between the GGSN and the MSC. The tunnel 21 conveys IP (Internet protocol) packets between the RNC and the MSC.

FIG. 3 is a signaling diagram illustrating a procedure for opening a signaling PDP context in response to a mobile station's attach procedure in a system as shown in FIGS. 1 and 2. In step 3-2, a mobile station MS initiates an attach procedure by sending the radio network controller RNC an ATTACH REQUEST message. In step 3-4, the RNC detects the attach message and forms a pre-configured PDP (packet data protocol) context. The preconfigured PDP context comprises a field called APN (access point name). This field can be set to '0408', for example. (The value is a mere example, but a value of '0408' suitably indicates that the mobile station uses a GSM protocol defined in ETSI recommendation GSM 04.08 to access the network.) At this stage, the RNC is able to relay the ATTACH REQUEST message to the MSC.

Let us assume that the RNC forms an OSP-type (Octet Stream Protocol) PDP context with an APN value of '0408'. In step 3-6, the RNC sends the SGSN a PDP CONTEXT ACTIVATION request with an APN value of '0408' and a PDP type of 'OSP'. In step 3-8, the SGSN relays these parameters to the GGSN in a CREATE PDP CONTEXT REQUEST message. In step 3-10, the GGSN recognizes the APN value of '0408', set by the RNC. Based on this APN value, the GGSN knows that future messages originating from this PDP context are to be tunneled to the Mobile services Switching Center MSC whose address has been configured in advance. In step 3-12, the GGSN requests the MSC to open a tunnel, and in step 3-14, the MSC acknowledges. In steps 3-16 and 3-18, the GGSN and the SGSN respond to the messages sent in steps 3-8 and 3-6, respectively. Now the RNC knows that a PDP context has been established and a tunnel has been created to the MSC. In step 3-22, the RNC relays the mobile station's ATTACH request to the MSC via the tunnel, and in step 3-24, the MSC responds by sending an ATTACH RESPONSE to the mobile station MS.

FIG. 4 is a signaling diagram illustrating a procedure for opening a real-time PDP context in response to a mobile-originated call request. In step 4-2, the mobile station MS initiates call establishment by sending a SETUP message which the RNC relays to the MSC in step 4-4. In step 4-6, the MSC responds to the SETUP message by sending a CONNECT message which the RNC relays to the mobile station MS in step 4-8. In step 4-10, the RNC detects the CONNECT message from the MSC and, on the basis of it, opens a PDP context for the connection such that the QoS (quality of service) parameters of the PDP context are suitable for conveying speech. (We assume that the call setup relates to a voice call.) The PDP CONTEXT ACTIVATION request is sent to the SGSN in step 4-12, and in step 4-14, the SGSN relays the request to the GGSN. The activation request message's parameters comprise a QoS TFT, or Quality of Service Traffic Flow Template. (A traffic flow template indicates which traffic flow relates to which PDP context. In this case, incoming packets to the mobile station in question should be associated with the PDP context being created now. The QoS preferably indicates a data rate of 64 kilobits per second which corresponds to the data rate of one circuit-switched speech channel.)

In step 4-16, the GGSN opens the requested PDP context and forms a logical connection to the MSC/CSCF. The result of this step is essentially that between the GGSN and the MSC/CSCF, there is now a logical connection able to support the required quality of service. At the MSC/CSCF (or a media gateway connected to it, not shown separately) this logical connection is adapted to PCM/TSL (Pulse-Coded Modulation/Transport Stream Layer) for circuit-switched operations. Alternatively, the MSC/CSCF adapts call control signaling messages to a protocol understood by terminals and call control nodes for packet-switched operations. Examples of such protocols are H.323 and SIP (Session Initiation Protocol). Then, the MSC/CSCF forms a suitable media stream, such as PCM-coded 64 kilobits per second.

In steps 4-18 and 4-20, a response to the PDP Context Activation request is returned to the RNC. In step 4-22, the established PDP context can be used to convey speech packets to the MSC (or to a transcoder (not shown separately) connected to or co-located with the MSC), which is shown as a speech path 4-22 over the MS-to-MSC tunnel.

FIG. 5 is a signaling diagram illustrating a procedure for opening a real-time PDP context in response to a mobile-terminated call request. FIG. 5 is almost similar to FIG. 4. Only the steps and messages relating to call establishment, namely messages 5-2 through 5-8, are reversed. The remaining steps and messages correspond to similarly numbered steps and messages in FIG. 4.

The invention has been described by way of example in connection with a UNITS system. On the basis of the above description, it is easy for one skilled in the art to apply the invention also to other mobile and wired systems. For instance, the invention can be used for establishing a connection between a packet-switched terminal and a circuit-switched switching element. Alternatively, the terminal and switching element may use different circuit-switched or packet-switched protocols. Yet further, the invention is not limited to a radio network but can be used in wired networks comprising an access network and a core network. Accordingly, the invention and its embodiments are not restricted to the above examples, but they can be modified within the scope of the claims.

What is claimed is:
1. An apparatus, comprising:
a radio network controller configured to:
 a) in an instance in which the apparatus determines to emulate a circuit-switched network toward a circuit-switched mobile terminal:
  emulate the circuit-switched network toward the circuit-switched mobile terminal, wherein the circuit-switched mobile terminal is capable of only circuit-switched operation between the circuit-switched mobile terminal and the radio network controller,
  emulate a packet-switched mobile terminal toward a packet-switched core network node,
  receive an attach request from the circuit-switched mobile terminal,
  cause a packet-switched signaling connection to be opened in response to the attach request,
  receive, while the packet-switched signaling connection is active, a second initiation signal from the circuit-switched mobile terminal comprising a request to establish a call to or from the circuit-switched mobile terminal,
  cause a real-time packet-switched data connection to be opened in response to the second initiation signal, and
  cause transmission of an activation request including an access point name and a packet data protocol (PDP) type in order to activate a PDP context and to cause a tunnel to the packet-switched core network node to be created; and
 b)) in an instance in which the apparatus determines to emulate a packet-switched network toward a packet-switched mobile terminal:
  emulate the packet-switched network toward the packet-switched mobile terminal,
  cause a signaling connection to be opened in response to a first signal from the packet-switched mobile terminal, and
  cause a data connection to be opened in response to a second signal from the packet-switched mobile terminal, the apparatus further comprising:
a processor configured to:

a) establish the packet-switched signaling connection between the radio network controller and the packet-switched core network node in response to a first initiation signal received from the circuit-switched mobile terminal, and
b) use the packet-switched signaling connection to open the real-time packet-switched data connection between the radio network controller and the packet-switched core network node, wherein the packet-switched signaling connection comprises a signaling PDP context connection, and wherein the real-time packet-switched data connection comprises a real-time PDP context connection.

2. The apparatus according to claim 1, wherein the radio network controller comprises an access network node of a wireless access network, wherein the packet-switched signaling connection is maintained as long as the circuit-switched mobile terminal is attached to the wireless access network, and wherein the real-time packet-switched data connection is maintained for a duration of the call.

3. The apparatus according to claim 1, wherein the packet-switched signaling connection and the real-time packet-switched data connection are maintained for a duration of the call.

4. The apparatus according to claim 1, wherein the radio network controller is further configured to:
emulate the real-time packet-switched data connection toward the circuit-switched mobile terminal; and
relay data to or from the circuit-switched mobile terminal via a circuit-switched connection.

5. A method, comprising:
a) in an instance in which a radio network is caused to emulate a circuit-switched network toward a circuit-switched mobile terminal:
emulating, in the radio network controller, the circuit-switched network toward the circuit-switched mobile terminal, wherein the circuit-switched mobile terminal is capable of only circuit-switched operation between the circuit-switched mobile terminal and the radio network controller;
emulating, in the radio network controller, a packet-switched mobile terminal toward a packet-switched core network node;
establishing, in response to receiving a first initiation signal comprising an access point and a packet data protocol (PDP) type from the circuit-switched mobile terminal, a packet-switched signaling connection between the radio network controller and the packet-switched core network node;
while maintaining the packet switched signaling connection, receiving, at the radio network controller, a second initiation signal comprising a request to establish a call to or from the circuit-switched mobile terminal, and in response to receiving the second initiation signal, using the packet-switched signaling connection to open a real-time packet-switched data connection between the radio network controller and the packet-switched core network node, the real-time packet-switched data connection carrying data to or from the packet-switched mobile terminal, wherein the packet-switched signaling connection comprises a signaling PDP context connection, and wherein the real-time packet-switched data connection comprises a real-time PDP context connection; and
causing, at the radio network controller, transmission of an activation request including an access point name and a PDP type in order to activate a PDP context and to cause a tunnel to the packet-switched core network node to be created; and
b) in an instance in which the radio network controller is caused to emulate a packet-switched network towards the packet-switched mobile terminal:
emulating, in the radio network controller the packet-switched network toward the packet-switched mobile terminal;
establishing a signaling connection in response to a first signal from the packet-switched mobile terminal, and
establishing a data connection in response to a second signal from the packet-switched mobile terminal.

6. The method of claim 5, further comprising:
receiving, in the radio network controller, the first initiation signal from the circuit-switched mobile terminal, wherein the first initiation signal is an attach request;
causing, at the radio network controller, in response to the first initiation signal, the packet-switched signaling connection to be opened; and
causing, at the radio network controller, in response to the second initiation signal, the real-time packet-switched data connection to be opened.

7. The method of claim 6, wherein the radio network controller comprises an access network node of a wireless access network, wherein the packet-switched signaling connection is maintained as long as the circuit-switched mobile terminal is attached to the wireless access network, and wherein the real-time packet-switched data connection is maintained for a duration of the call.

8. The method of claim 6, wherein the packet-switched signaling connection and the real-time packet-switched data connection are maintained for a duration of the call.

9. The method of claim 5 further comprising:
emulating, at the radio network controller, the real-time packet-switched data connection toward the circuit-switched mobile terminal; and
relaying, at the radio network controller, data to or from the circuit-switched mobile terminal via a circuit-switched connection.

10. A computer program product comprising a non-transitory computer-readable storage medium storing a computer program, the program configured to control a processor to perform a process, the process comprising:
in an instance in which a radio network controller is caused to emulate a circuit-switched network toward a circuit-switched mobile terminal:
causing emulation, in the radio network controller, of the circuit-switched network toward the circuit-switched mobile terminal, wherein the circuit-switched mobile terminal is capable of only circuit-switched operation between the circuit-switched mobile terminal and the radio network controller;
causing emulation, in the radio network controller, of a packet-switched mobile terminal toward a packet-switched core network node,
establishing, in response to receiving a first initiation signal comprising an access point and a packet data protocol type from the circuit-switched mobile terminal, a packet-switched signaling connection between the radio network controller and the packet-switched core network node;
while maintaining the packet-switched signaling connection, receiving, at the radio network controller, a second initiation signal comprising a request to establish a call to or from the circuit-switched mobile terminal, and in response to receiving the second initiation signal, using the packet-switched signaling connection to open a real-time packet-switched data connection between the radio network controller and the packet-switched core network node, the real-time packet-switched data connection carrying data to or from the packet-switched mobile terminal, wherein the packet-switched signaling connection comprises a signaling Packet Data Protocol (PDP) context connection, and wherein the real-time packet-switched data connection comprises a real-time PDP context connection; and causing, at the radio network controller, transmission of an activation request including an access point name and a PDP type in order to activate a PDP context and to cause a tunnel to the packet-switched core network node to be created; and in an instance in which the radio network controller is caused to emulate a packet-switched network toward the packet-switched mobile terminal:
  emulating, in the radio network controller, the packet-switched network toward the packet-switched mobile terminal;
  establishing a signaling connection in response to a first signal from the packet-switched mobile terminal, and
  establishing a data connection in response to a second signal from the packet-switched mobile terminal.

11. The computer program product of claim 10, wherein the program is further configured to control a processor to further perform the process, the process further comprising:
  receiving, in the radio network controller, the first initiation signal from the circuit-switched mobile terminal, wherein the first initiation signal is an attach request;
  causing, at the radio network controller, in response to the first initiation signal, the packet-switched signaling connection to be opened; and
  causing, at the radio network controller, in response to the second initiation signal, the real-time packet-switched data connection to be opened.

12. The computer program product of claim 11, wherein the radio network controller comprises an access network node of a wireless access network, wherein the packet-switched signaling connection is maintained as long as the circuit-switched mobile terminal is attached to the wireless access network, and wherein the real-time packet-switched data connection is maintained for a duration of the call.

13. The computer program product of claim 10, wherein the program is further configured to control a processor to further perform the process, the process further comprising:
  emulating, at the radio network controller, the real-time packet-switched data connection toward the circuit-switched mobile terminal; and
  relaying, at the radio network controller, data to or from the circuit-switched mobile terminal via a circuit-switched connection.

14. An apparatus comprising at least one processor and at least one memory including computer program code, the at least one memory and computer program code configured to, with the processor, cause the apparatus to at least:
  in an instance in which the apparatus determines to emulate a circuit-switched network toward a circuit-switched mobile terminal:
    cause emulation, in a radio network controller, of the circuit-switched network toward the circuit-switched mobile terminal, wherein the circuit-switched mobile terminal is capable of only circuit-switched operation between the circuit-switched mobile terminal and the radio network controller;
  cause emulation, in the radio network controller, of a packet-switched mobile terminal toward a packet-switched core network node;
  establish, in response to receiving a first initiation signal comprising an access point and a packet data protocol type from the circuit-switched mobile terminal, a packet-switched signaling connection between the radio network controller and the packet-switched core network node;
  while maintaining the packet-switched signaling connection, receive, at the radio network controller, a second initiation signal comprising a request to establish a call to or from the circuit-switched mobile terminal, and in response to receiving the second initiation signal, use the packet-switched signaling connection to open a real-time packet-switched data connection between the radio network controller and the packet-switched core network node, the real-time packet-switched data connection carrying data to or from the packet-switched mobile terminal, wherein the packet-switched signaling connection comprises a signaling Packet Data Protocol (PDP) context connection, and wherein the real-time packet-switched data connection comprises a real-time PDP context connection; and
  cause, at the radio network controller, transmission of an activation request including an access point name and a PDP type in order to activate a PDP context and to cause a tunnel to the packet-switched core network node to be created; and
  in an instance in which the apparatus determines to emulate a packet-switched network toward the packet-switched mobile terminal:
    cause emulation of, in the radio network controller, the packet-switched network toward the packet-switched mobile terminal,
    establish a signaling connection in response to a first signal from the packet-switched mobile terminal, and
    establish a data connection in response to a second signal from the packet-switched mobile terminal.

15. The apparatus according to claim 14, wherein the radio network controller comprises an access network node of a wireless access network, wherein the packet-switched signaling connection is maintained as long as the circuit-switched mobile terminal is attached to the wireless access network, and wherein the real-time packet-switched data connection is maintained for a duration of the call.

16. The apparatus according to claim 14, wherein the radio network controller is further configured to:
  emulate the real-time packet-switched data connection toward the circuit-switched mobile terminal; and
  relay data to or from the circuit-switched mobile terminal via a circuit-switched connection.

* * * * *